Feb. 26, 1952     E. B. SCHWARTZ     2,586,999
CONTACT SEQUENCE TEST SET
Filed Sept. 28, 1949     2 SHEETS—SHEET 1
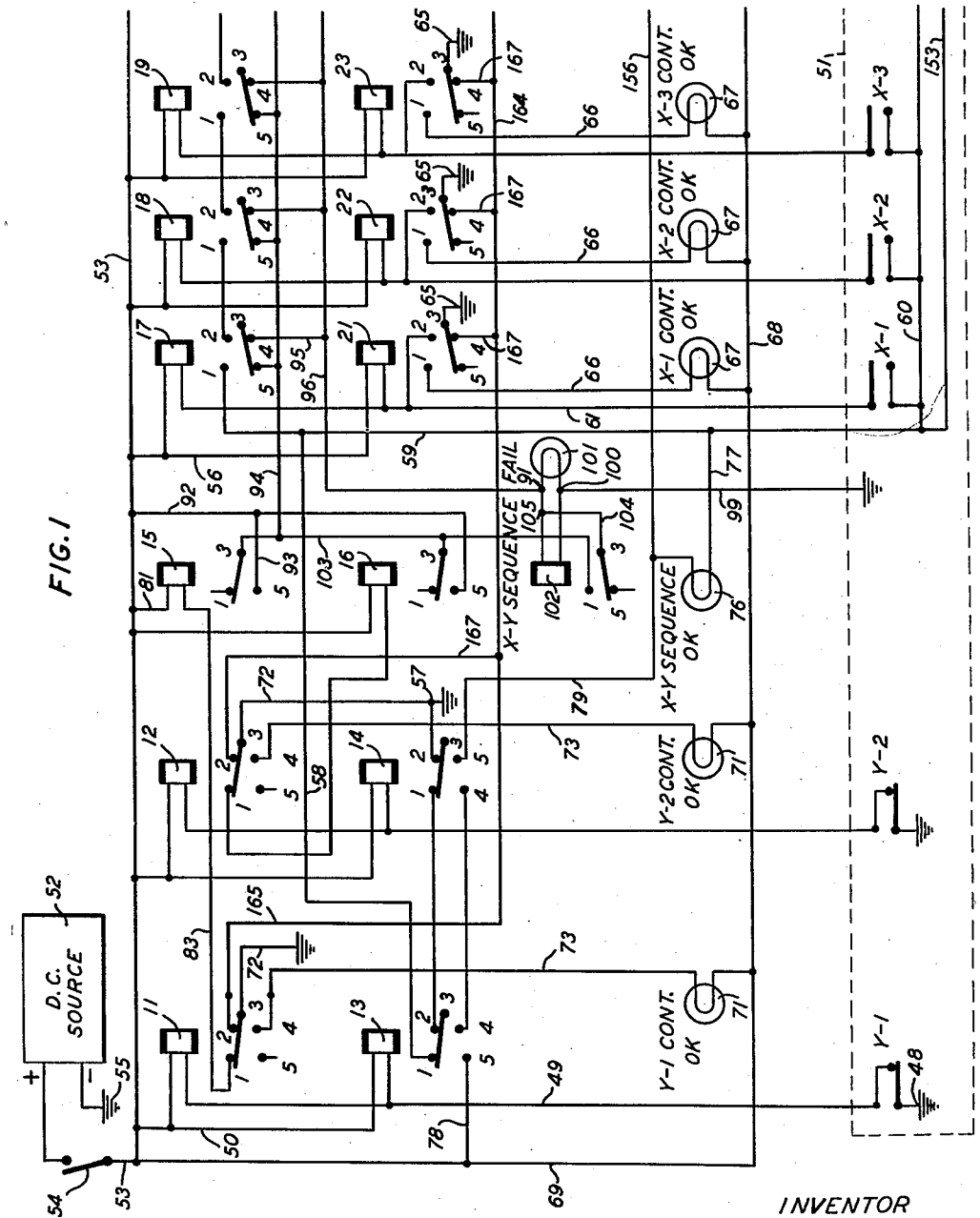
INVENTOR
E. B. SCHWARTZ
BY W. C. Parnell
ATTORNEY

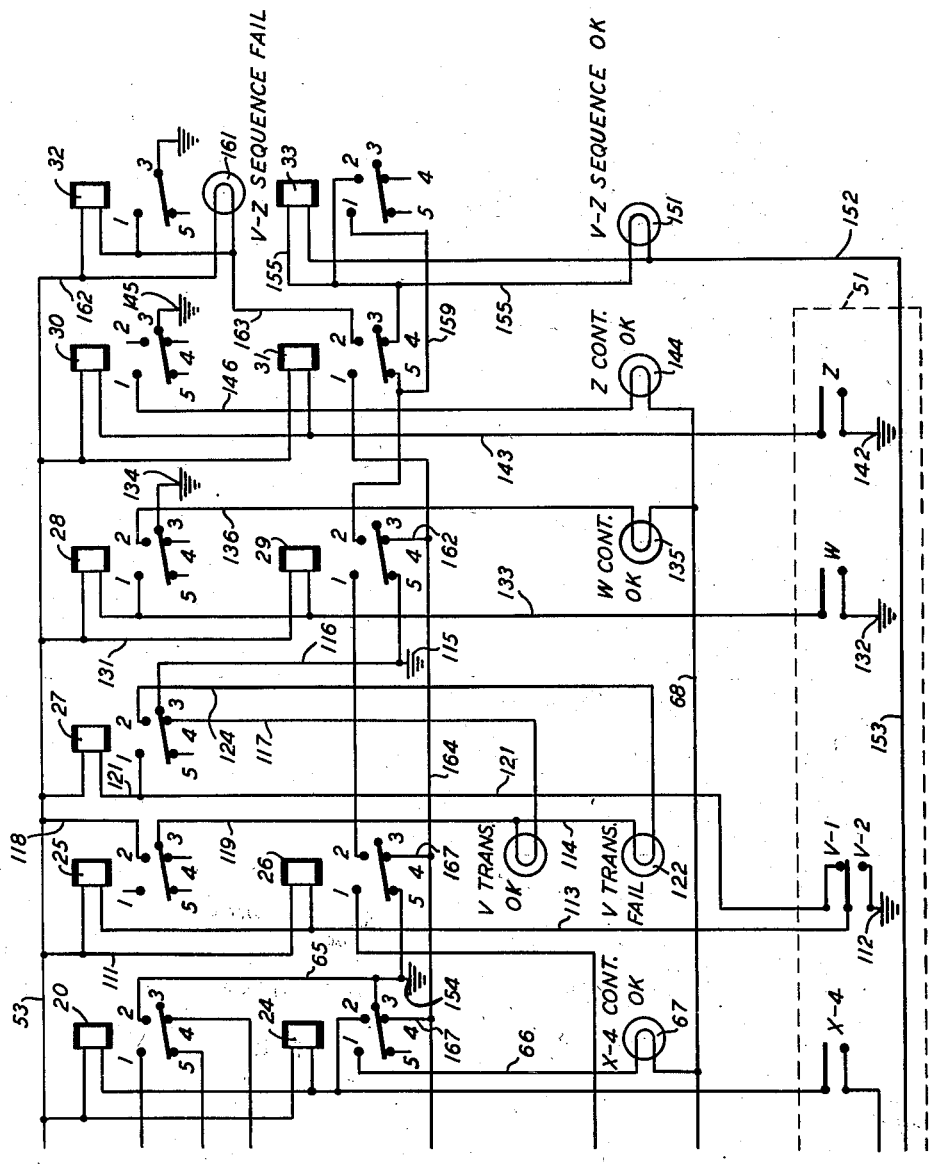

Patented Feb. 26, 1952

2,586,999

UNITED STATES PATENT OFFICE 2,586,999

CONTACT SEQUENCE TEST SET

Everett B. Schwartz, Wauwatosa, Wis., assignor to Western Electric Company, Incorporated, New York, N. Y., a corporation of New York Application September 28, 1949, Serial No. 118,385

4 Claims. (Cl. 175—183)

This invention relates to the testing of electrical apparatus and more particularly to the testing of the contacts of an electrical device for proper sequence of operation.

In many previous contact sequence test sets, the test operator actuates the contacts to be tested slowly and repeatedly, if necessary, to observe the sequence of operation either directly or by means of lamps. However, in the case of many contact units and similar apparatus used in telephony and other communications fields, the complexity of the sequence requirements renders the above procedure impractical. Moreover in testing such a contact key by this old method, it would have to be operated very much slower than it would operate in normal use and, as a result, such a test would not be completely satisfactory.

It is therefore an object of this invention to enable the sequence of complex contact units to be tested accurately and at the normal operating speed of the unit.

Applicant accomplishes his object by balancing the operating time of an "OK" interpreting group of relays against that of a "fail" interpreting group of relays to actuate an "OK" or a "fail" indicator, depending on the correctness of contact sequence. High speed type relays are used in the test circuit to enable the sequence requirements of a contact unit to be tested while operating the unit at its normal speed.

Other objects and advantages will be apparent from the following detailed description taken in conjunction with the attached drawing in which:

Figs. 1 and 1A are schematic wiring diagrams of the invention.

With reference to the drawing, the dotted enclosure 51 represents a key having contacts Y-1, Y-2, X-1, X-2, X-3, X-4, V-1, V-2, W and Z. For the purpose of illustrating the general principles of the invention let it be assumed that the various contacts are normally in the positions shown and that upon operation of the key the following sequence requirements must be met:

First, all four of the X contacts must close before either Y contact opens.

Second, contact V-1 must open before contact V-2 closes.

Third, all other contacts must have operated before the Z contact closes.

The circuit for testing the contact sequence is supplied with potential from a source 52. The positive side of the voltage source, which for convenience will be hereafter referred to as "battery," is connected to the main part of the test set through lead 53, said lead containing a switch 54 for disconnect purposes. The negative side of the voltage supply is grounded at the point 55.

The actuation of the contacts for the purpose of testing their sequence may be accomplished in any suitable manner, either manually or through a mechanical or electrical device. The method employed will of course depend largely on the type structure on which the contacts are mounted.

With reference to the sequence of the contacts, the first requirement is tested by the proposed test circuit in the following manner:

First, assuming that the two Y contacts are made, it will be seen that this causes the four Y relays 11, 12, 13 and 14 associated with the Y contacts to become energized and operate. When contact Y-1 closes, for example, it allows ground to be supplied to the windings of relays 11 and 13 from ground point 48 through the contact Y-1 and lead 49. Since relays 11 and 13 have a constant battery supply through leads 53 and 50, the relays operate with the closing of the Y-1 contact, causing contacts 3 of the relays to close against contacts 1 and 2. Relays 12 and 14 are similarly caused to operate by the closing of the Y-2 contact. The operated position is the normal condition of the Y relays.

Next, assume that the X contacts all close before either of the Y contacts break, which fulfills the required condition. Using X-1 contact as an example, it will be seen that battery will be supplied to the coils of relays 17 and 21, which are associated with the key contact X-1, through the leads 53 and 56. Ground for relays 17 and 21 comes from the point 57 through upper contacts 1 and 2 of energized relays 14 and 13, through the leads 58, 59, and 60, through the closed X-1 contact and lead 61 to the windings of relays 17 and 21. Relays 18, 19, 20, 22, 23, and 24 are similarly energized. Since all of the X relays, i. e., the relays 17 through 24 associated with the X contacts, have a steady battery supply, these relays operate when ground is completed by the closing of the X contacts. It is obvious that since ground for the operation of the X relays passes through the upper contacts 1 and 2 of relays 13 and 14, it is necessary that the X relays operate during the time that relays 13 and 14 are energized if they are to operate at all. For example, if relay 13 should be de-energized as the result of the Y-1 key contact breaking, relays 17 and 21 will not be able to operate at all if they have not done so before this occurrence, as they will no longer be able to obtain ground for their respective relay coils.

When the so-called X relays operate, contacts 3 of these relays are closed against the relay contacts 1 and 2 in each of the eight X relays 17 through 24. When this happens in connection with relays 21, 22, 23, and 24, a new ground is supplied to all of the X relays through ground leads 65. The X relays thus lock themselves in and have a ground connection even though the original ground circuit is broken by the de-energization of the Y relays 13 and 14.

In addition, when the contacts 3 of relays 21 through 24 close against the contacts 1 and 2 of these relays when the relays become energized, ground is advanced through ground leads 65, relay contacts 1 and 3, and leads 66 to one side of the four contact OK lamps 67 corresponding to the contacts X-1, X-2, X-3 and X-4 to be tested. The other sides of these lamps are connected through leads 68 and 69 to the positive side of the voltage source 52. The operation of the X relays thus energizes the circuits of the lamps 67 and causes them to light. These contact OK lamps have nothing to do with the current sequence of operation of the key contacts, but merely show that the circuit corresponding to a particular X contact is complete, and that the relays in that circuit have operated.

The above explanation covers the operation of the X and Y contact circuits when the X contacts make before the Y contacts are broken. If the X contacts all make before either of the Y contacts break, as is the requirement, this fact of correct sequence is indicated by the X—Y sequence OK lamp 76. When this condition occurs, ground is supplied to the X—Y sequence OK lamp 76 from the ground lead 65 corresponding to relays 20 and 24, through contacts 1 and 2 of operated relays 17 through 20, and through lead 59 and lead 77 to the lamp 76. Battery for the other side of the sequence lamp comes through lead 69, lead 78, lower contacts 4 and 5 of the now de-energized relays 13 and 14, and through lead 79 to the sequence lamp 76. It will be seen from the circuit that if any of the X contacts were to make after either of the Y contacts opened, the sequence OK lamp could not light. The reason for this is that the relays corresponding to the laggard X contact would not operate as its ground would not be supplied through the contacts of relays 13 and 14, and therefore contact 3 of the upper of the two relays corresponding to the laggard contact relay would not make with contacts 1 and 2 of this relay so as to provide a series path for ground to be supplied to the sequence OK lamp 76.

When the Y-1 and Y-2 contacts follow their correct sequence and break after all of the X contacts have made, this breaks the ground connection for all of the Y relays 11 through 14, and causes these relays to become de-energized. When the Y relays are de-energized, contacts 3 of these relays break with the upper contacts 1 and 2 and make with the lower contacts 4 and 5 of the relays. The de-energization of the Y relays also causes the Y-1 and Y-2 continuity OK lights 71 to light, since ground is now advanced to one side of these lights through ground leads 72, contacts 3 and 4 of relays 11 and 12 and leads 73. The other sides of these lights are connected to battery through leads 68 and 69.

In case any of the X contacts makes after any of the Y contacts break, this incorrect sequence is picked up and indicated by a sequence fail circuit as follows.

Two auxiliary relays 15 and 16 are associated with Y contacts Y-1 and Y-2 respectively. With reference to relay 15 for example, battery is supplied through leads 53 and 81. Ground for the relay winding comes through ground lead 72, through contacts 3 and 1 of relay 11, and through the lead 83 to the winding of relay 15. Direct current potential is supplied to the winding of relay 16 in a similar manner. When Y-1 and Y-2 contacts break, relays 11 and 12 are de-energized, and contacts 3 of these relays break with contacts 1, thus removing ground from relays 15 and 16, causing them to become de-energized. When this happens, contacts 3 of these relays break with contacts 1 and make with contacts 5. This entire operation takes place at a relatively high speed.

If contact X-1, for example, does not make until after one of the Y contacts has broken, for example, Y-1, relay 17 will not operate since it cannot secure its necessary ground through relay 13, and as a result, contact 3 of relay 17 will not make across contacts 1 and 2 but will remain bridged across contacts 4 and 5. Then when relay 15 has become de-energized as a result of the breaking of contact Y-1, as described above, battery will now be supplied to the point 91 of the sequence fail circuit through the leads 53, 92, 93, contacts 5 and 3 of relay 15, lead 94, contacts 5, 3 and 4 of unoperated relay 17, and through leads 95 and 96 to the point 91. Ground for the X—Y sequence fail circuit is supplied to point 100 through ground lead 99. The X—Y sequence fail circuit includes the indicating lamp 101 and a relay 102, and the application of direct current to the circuit as described will cause the lamp 101 to light and indicate the fact that the sequence of the X and Y contacts under test is incorrect. The relay 102 will also become energized and cause contact 3 of the relay to make against contact 1. This will allow battery to reach the sequence fail circuit through leads 53, 92, 93, contacts 5 and 3 of relay 15, through lead 103, contacts 1 and 3 of relay 102, and through lead 104 to the point 105. This additional battery connection allows the relay 102 to lock in against possible loss of its battery supply through the contacts of relay 17.

Similarly, if any of the other X contacts, i. e., X-2, X-3, or X-4 prove to be laggard, their unoperated relays will provide a path through which battery will be supplied to actuate the sequence fail circuit and indicate the fact of incorrect sequence.

All of the foregoing explanation has been based on the assumption that the operating time of the X relays was the same as the release time of the Y relays. In other words, it was assumed that if all of the X contacts made at the same instant that all of the Y contacts broke, the contacts 3 of the X relays would make across contacts 1 and 2 of these relays, and the X relays would lock in at the same time that the Y relays released. One feature of the invention consists in thus balancing the operating time of the X and Y relays against each other so that if all of the X contacts make before the Y contacts break, the X relays will all operate and provide a path to actuate the X—Y sequence OK lamp. The X relays may therefore be considered as an "OK" interpreting group of relays.

If any of the Y contacts should break before any of the X contacts make, the corresponding Y relays would release and prevent the operation of the relays corresponding to the laggard X contact. This condition would break the circuit needed for the operation of the X—Y sequence OK lamp, but would provide a circuit for the actuation of the X—Y sequence fail lamp. The Y relays may therefore be considered as being in effect a group of "fail" interpreting relays. In actual practice, the balance of the two normal operating times for the two sets of relays may be adjusted so that the "OK" interpreting group of relays is slightly handicapped, which may be done by adjusting the X relays to make the operating time for example, .002 second longer than the release time of the Y "fail" interpreting group of relays. This would mean that the X contacts would have to make at least two milliseconds before any of the Y contacts broke in order to actuate the X—Y sequence OK lamp. This procedure would favor the rejection of contact assemblies which actually met the sequence requirements but with insufficient margin of safety.

The X and Y relays and all other relays used in the test set whose operating times are balanced against each other are of a high speed type, such as the mercury contact relay disclosed in Patent 2,289,830 to Ellwood, July 14, 1942. The resulting increase in speed of testing increases the accuracy of the test results.

The second basic assumed requirement, that the V–1 contact shall break before the V–2 contact makes, may be stated in another way, i. e., that no bridging of these contacts is to occur during their operation.

If bridging of the transfer contacts does not occur, that is, if contact V–2 makes after contact V–1 has broken, relays 25 and 26 will become energized and operate. Battery for both relays will be supplied through leads 53 and 111. Ground for the two relays will come from ground point 112, through contact B–2, and through lead 113 to the windings of relays 25 and 26. The transfer relay 27 will not operate when there is no bridging of the V–1 and V–2 contacts, which means that for a correct sequence of these contacts, contact 3 of the transfer relay 27 will make across relay contacts 4 and 5. This enables ground to be supplied to the V transfer OK lamp 114 from the ground point 115, ground reaching the lamp through lead 116, contacts 3 and 4 of the transfer relay 27, and through lead 117 to the V transfer OK lamp 114. Battery for this lamp is supplied from the lead 53, lead 118, contacts 2 and 3 of the operated relay 25, and through lead 119 to the V transfer OK lamp 114.

If contacts V–1 and V–2 bridge momentarily during the operation of the contact structure, that is, if contact V–1 is still made when the V–2 contact is made, it will cause transfer relay 27 to be operated. Battery for the relay 27 is supplied from the lead 53. Ground for this relay will be supplied from the point 112, through contacts V–2 and V–1, and through lead 121 to the winding of the transfer relay 27. When this relay operates, contact 3 of the relay will make across relay contacts 1 and 2, and the relay will lock in by being provided with a new ground through lead 121, through contacts 1 and 3 of the relay, and through lead 116 to ground at the point 115. By locking up, transfer relay 27 remains operated even after the V–1 contact has been broken. The operation of relay 27 will break the circuit of the V transfer OK lamp 114, and will complete a circuit for the V transfer fail lamp 122. Ground for the transfer fail lamp 122 will be supplied from ground point 115, through lead 116, contacts 3 and 2 of relay 27, and through lead 124 to the lamp 122. Battery for the lamp 122 is supplied through leads 53 and 118, through contacts 2 and 3 of relay 25, and through lead 119 to the lamp 122.

When contact W is closed, during the test actuation of the contacts, relays 28 and 29 are caused to operate, with battery for these two relays being supplied from the leads 53 and 131. Ground for these relays comes from ground point 132, through contact W–1, and through lead 133 to the windings of relays 28 and 29. Relays 28 and 29 are locked in after operation by virtue of being supplied with a new ground through contacts 1 and 3 of the now operated relay 28 to ground point 134. The W contact OK lamp 135 is connected to battery through leads 68 and 69. Ground is supplied to the lamp 135 from ground point 134, through contacts 3 and 2 of relay 28, and through lead 136 to the lamp 135.

When contact Z is closed, relays 30 and 31 are operated, with battery being supplied through leads 53 and 141. Ground for these relays comes from ground point 142 through contact Z, and through lead 143 to the windings of the two relays. Z contact OK lamp 144 is connected to battery through leads 68 and 69. Ground for the Z contact OK lamp 144 is supplied from ground point 145 through contacts 3 and 1 of the relay 30, and through lead 146 to the lamp 144. When the Z contact operates successfully, the Z contact OK lamp 144 lights up regardless of the sequential timing of the contacts under test.

The final assumed basic sequence requirement is that the Z contact shall close only after all of the V to Y contacts have operated.

If the contact sequence is correct, and all V to Y contacts have operated before the operation of the Z contact, voltage is applied to the V—Z sequence OK lamp 151 and its associated relay 33. Ground for the relay and the lamp is supplied through leads 152, 153, 59, upper contacts 1 and 2 of operated relays 17, 18, 19, and 20, and through lead 65 to ground point 154. Battery for the lamp 151 and the relay 33 may be traced through the lead 155, through unoperated contacts 4 and 5 of relay 31, through the operated 1 and 2 contacts of relays 29 and 26, through lead 156, through contacts 4 and 5 of de-energized relays 14 and 13, and through leads 78 and 69 to battery. When potential is applied to the V—Z sequence OK lamp 151 and the relay 33, the lamp will light and thus indicate the fact of correct sequence. Relay 33, when operated, will lock in by by-passing contacts 4 and 5 of relay 31, as its battery connection will then go from lead 155 through closed contacts 2 and 1 of the operated relay 33, and through lead 159 to the 1 and 2 contacts of operated relay 29. This insures that the V—Z sequence OK lamp will remain lit even after the operation of relay 31 caused by the closing of the Z contact.

It will be seen from the above description that the relays associated with contacts V through Y are located in either the ground side or the battery side of the voltage source for lamp 151, and that this V—Z sequence OK lamp will not operate unless all of the V through Y contacts have operated prior to the closing of the Z contact.

If any one of the V through Y contacts should lag the Z contact in its operation, a V—Z sequence fail circuit is actuated. This circuit includes a V—Z sequence fail lamp 161 and an associated relay 32. Battery for both the lamp and the relay is supplied from leads 53 and 162. The ground side of the lamp and relay passes through lead 163, contacts 1 and 2 of the operated relay 31, and through leads 164 and 165 to contact 2 of relay 11. If contact Y–1 has not opened and de-energized relay 11 before the closing of the Z contact and operation of relay 31, a circuit will be completed to ground through contacts 2 and 3 of relay 11 and lead 72, thus operating the V—Z sequence fail lamp 161 and relay 32. If relay 11 is properly de-energized at the time of operation of relay 31, the ground circuit for lamp 161 will be open at contact 2 of relay 11 and the lamp will not obtain its ground through the relay 11. Similarly, it will be seen from the drawing that relays 12, 21, 22, 23, 24, 26, and 29 all have leads 167 parallel to lead 165, each of which is connected to ground through the relay contacts when the relay in question has not operated properly before the closing of the Z contact. Proper operation for the relays associated with the V through X contacts means that these relays have become energized, while proper operation for the Y relays means that they have become de-energized as the result of the breaking of the two Y contacts. Thus, if any of the V to Y contacts lag the Z contact in operation, it will cause the V—Z sequence fail circuit to become energized and indicate the fact of incorrect sequence. When potential is applied to operate the relay 32 associated with V—Z sequence fail lamp 161, the relay 32 will lock in to ground through its contacts 1 and 3. This will maintain the sequence fail signal even after the laggard contact has operated.

In the V—Z sequence test, as in the X—Y sequence test, the correctness of sequence is tested by balancing the operating times of various relays. In this case, the operating time of the Z relay 31 is balanced against the time of operation of the relays corresponding to the V through Y contacts with the result that V—Z sequence OK circuit will be energized if the V through Y contacts all operate before the Z contact, whereas, if this required sequence does not occur, the laggard contact will cause its relay to break the OK circuit and energize the V—Z sequence fail circuit. Also, as in the X—Y test, the Z relay 31 may be handicapped in actual use by slightly reducing its operating time so as to favor the rejection of those contact units which meet the V—Z sequence requirement but with insufficient margin of safety.

In the foregoing tests, two relays are shown and described in connection with each contact. Obviously, if suitable high speed relays capable of operating both sets of contacts were available, one such relay might be used for each pair of relays shown.

The use of high speed relays such as the mercury type enable sequence tests of the type herein described to be performed at the normal operating speed of the contact unit. This removes the uncertainty as to accuracy of results which is often present when these tests, because of limitations in the testing apparatus, must be performed at speeds slower than the normal operating speed.

Although the particular test set described to illustrate the invention is applicable to testing only for certain assumed sequence requirements, the general principle of balancing the operating times of one group of relays against another to indicate correct or incorrect sequence of operation of the apparatus under test can be applied to any other assumed requirements.

It is to be understood, therefore, that the above-described arrangements are simply illustrative of the application of the principles of the invention. Numerous other arrangements may be readily devised by those skilled in the art which will embody the principles of the invention and fall within the spirit and scope thereof.

What is claimed is:

1. Apparatus for testing the sequence of operation of normally open and normally closed contacts in which a particular normally open contact is to close only after all other contacts have moved to an off-normal position, comprising a plurality of normally operated and normally released relays, one of which is associated with each contact and which is operated by the closing of the contact, an indicator, an energizing circuit for the indicator which is completed when the relay corresponding to the said particular contact is unoperated and the other relays are in an off-normal condition, a second indicator, and an energizing circuit for the indicator which is completed when the relay corresponding to the particular contact is operated and any other relay is in its normal condition.

2. Apparatus for testing electrical devices having a plurality of normally closed and normally open pairs of contacts for operation in a predetermined sequence, said apparatus comprising at least one relay controlled by each pair of contacts and having normally open and normally closed contacts, two indicators for indicating correct and incorrect sequence of contact operation respectively, an energizing circuit for the correct sequence indicator extending in series through the normally closed contacts of a last relay controlled by the contacts of the device which are to be operated last in the sequence and through the normally open contacts of the other relays and an energizing circuit for the incorrect sequence indicator extending in series through the normally open contacts of the last relay and through the normally closed contacts of the other relays in parallel.

3. Apparatus for testing the sequence of operation of normally closed and normally open contacts, comprising a normally operated relay, a normally unoperated relay, an energizing circuit for the normally operated relay, said circuit being completed through the normally closed contact, an energizing circuit for the normally unoperated relay, said circuit being completed through the normally operated relay on a closed condition of the normally open contact, an indicator energized when the normally operated relay is unoperated and the normally unoperated relay is operated and a second indicator which is energized when both relays are unoperated.

4. Apparatus for testing the sequence of operation of normally closed and normally open contacts, comprising two normally unoperated relays, a circuit completed by the closing of the normally open contact for operating one of the relays, a circuit completed by the bridging of the normally closed and normally open contacts for operating the other relay, a first indicator, an energizing circuit for the first indicator which is completed when the said one relay is operated, a second indicator, and an energizing circuit for the second indicator, said circuit being completed when both relays are in an operated condition.

EVERETT B. SCHWARTZ.

REFERENCES CITED

The following references are of record in the file of this patent:

UNITED STATES PATENTS

| Number | Name | Date |
|---|---|---|
| 1,433,543 | Garrison | Oct. 31, 1922 |
| 1,716,471 | Tharp | June 11, 1929 |
| 2,478,946 | Rose | Aug. 16, 1949 |